C. S. RICKER.
BEARING.
APPLICATION FILED SEPT. 25, 1919.

1,373,974.

Patented Apr. 5, 1921.

Inventor
Chester S. Ricker

By Hood & Schley
Attorneys.

UNITED STATES PATENT OFFICE.

CHESTER S. RICKER, OF INDIANAPOLIS, INDIANA, ASSIGNOR TO THE OAKES CO., OF INDIANAPOLIS, INDIANA, A CORPORATION OF INDIANA.

BEARING.

1,373,974.     Specification of Letters Patent.     Patented Apr. 5, 1921.

Application filed September 25, 1919. Serial No. 326,128.

*To all whom it may concern:*

Be it known that I, CHESTER S. RICKER, a citizen of the United States, residing at Indianapolis, in the county of Marion and State of Indiana, have invented a new and useful Bearing, of which the following is a specification.

It is the object of my present invention to lubricate amply but not too greatly rotating structures having rotating annular oil chambers, such for instance as automobile fans, and to minimize leakage of the lubricant at the packed joints. The specific features of the application relate to structures mounted on stationary shafts.

Figure 1:
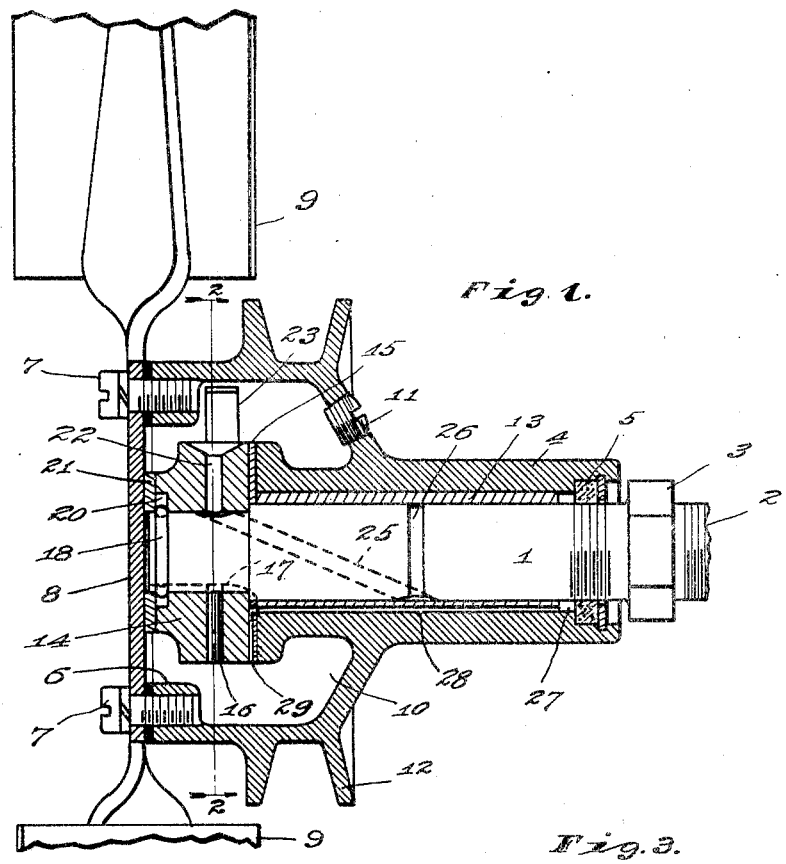
Figure 2:
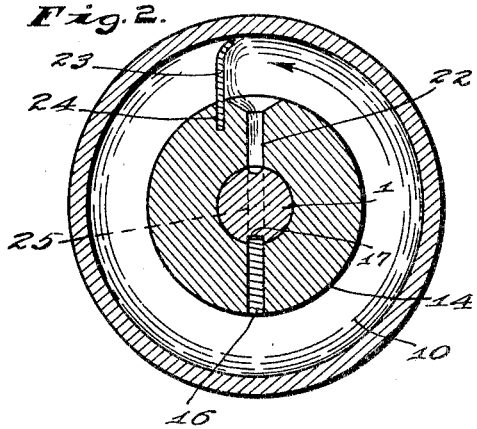
Figure 3:
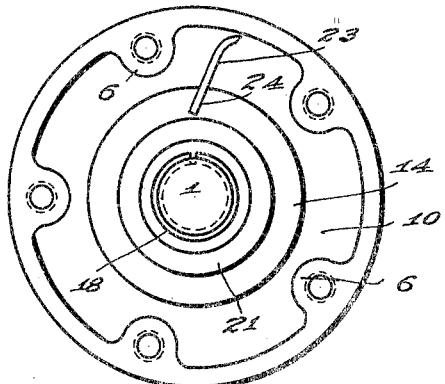

The accompanying drawing illustrates my invention: Figure 1 is a central longitudinal section through a fan mounting embodying my invention; Fig. 2 is a section on the line 2—2 of Fig. 1; and Fig. 3 is an end elevation of the structure shown in Fig. 1, with the end plate removed, to show how the parts can be assembled.

The stud shaft 1 on which the fan is supported is shown as having the usual screw-threaded end 2 and hexagonal wrench-receiving collar 3 whereby it may be suitably attached to any convenient support. The fan hub 4 is mounted on the stud shaft 1, and is provided at the end toward the collar 3 with a suitable packing 5 for closing the joint between them. The hub 4 is enlarged at its end opposite the packing 5, and is there provided with inwardly projecting lugs 6 for receiving screws 7 by which the end plate 8 carrying the fan blades 9 may be attached to such hub. This provides a lubricant-holding chamber 10 within the enlarged end of the hub, to which chamber lubricant may be supplied through a suitable hole closed by a removable screw plug 11. The hub 4 is provided with any usual driving portion, such as the pulley 12 on its larger end.

The hub 4 is provided with an internal bushing 13 which rotates with the hub so that the bearing surfaces are between such bushing and the stud shaft 1. The outer end of the stud shaft 1 is made somewhat smaller than the body thereof, to receive a removable collar 14 which holds the hub 4 in place. A thrust-ring 15 rotatable with the hub 4 is located between the adjacent faces of the hub 4 and collar 14, so that the bearing surfaces are between such thrust-ring and collar. The removable collar 14 is prevented from turning by being provided with a pin 16 coöperating with a keyway 17 in the stud shaft at its outer end; and is held against axial movement in one direction by abutting against the shoulder between the large and small portions of the stud shaft, and in the other by a spring ring 18 which is received in a suitable circumferential groove 19 in the stud shaft and in a circumferential rabbet 20 in the inner edge of the outer end face of the collar 14. A thrust-ring 21 fits on the outer end of the stud shaft 1 just outside the split ring 18, and bears against both the collar 14 and the end plate 8. Thus the hub 4 is held against axial movement in either direction by the collar 14.

The collar 14, preferably on its upper side, is provided with an axial hole 22 connecting its inner and outer surfaces, and the outer end of this hole 22 is countersunk to form a funnel. A deflecting baffle plate 23 is mounted in a slot 24 in the collar 14 and projects upward on one side, circumferentially, of the hole 22. This baffle 23 is located on that side of the hole 22 toward which the hub 4 rotates, for such rotation in any particular automobile fan is always in the same direction, as indicated by the arrow. The outer end of the baffle 23 is bent oppositely to the direction of the hub rotation, as is clear from Fig. 2, and is located quite close to the inner surface of the lubricant-holding chamber 10. The baffle is farther inward from the end of the hub than are the lugs 6, so that it will not interfere with such lugs. In assembling the construction, the collar 14 and baffle 23 are put in place with the lugs 6 turned out of the way of such baffle, as is clear from Fig. 3. The baffle 23 is narrower than the wide end of the funnel mouth of the hole 22, and is slightly displaced from such hole axially of the stud shaft 1, as is clear from Fig. 1. The inner end of the hole 22 connects at one end with an oblique hole 25 through the stud shaft, and the other end of such oblique hole 25 communicates with a circumferential groove 26 in the stud shaft about midway of the bushing 13.

The bushing 13 stops short of the packing 5 to provide an annular space 27; and such bushing is provided with a longitudinal groove 28 in its outer surface, which groove communicates at one end with the space 27 and at the other with a radial groove 29 in the face of the thrust-ring 15 bearing against the collar 14, which radial groove 29 opens into the lubricant-holding chamber 10.

In operation, when the hub 4 is rotated the lubricant gathers by centrifugal force on the outer boundary wall of the lubricant-holding chamber 10 and travels around with the hub. This moving lubricant strikes the stationary baffle 23, and is deflected thereby into the hole 13, and thence through the oblique hole 25 to the circumferential groove 26, from which it lubricates the bearing surfaces between the stud shaft 1 and the bushing 13. The lubricant works along these bearing surfaces, in both directions. That which works toward the end plate 8 eventually passes outward along the bearing faces between the collar 14 and thrust-ring 15, into the lubricant-holding chamber 10. That which works in the other direction passes into the annular space 27; but is prevented from accumulating there and forcing itself out past the packing 5 by being sucked along the grooves 28 and 29 and discharged into the lubricant chamber 10 by reason of the centrifugal force which is developed within the radial groove 29, which also effectively lubricates the bearing surfaces of the thrust-ring 15 and the collar 14. The baffle 23 supplies lubricant in ample quantity for substantially all speeds of rotation; but this quantity is not too great for any speed. By having the baffle 23 narrower than the end of the hole 22, and by having it slightly displaced from such hole both circumferentially and axially, it feeds lubricant into the hole 22 at all speeds of hub rotation, but does not make the feed a positive one, so that any excess of lubricant will flow freely past the edges of the baffle 23 and will not force its way into the hole 22.

I claim—

1. In combination, a stationary supporting member, a rotatable member rotatably supported by said supporting member and provided with an internal annular lubricant-holding chamber, said supporting member being provided with a passageway communicating with the bearing surfaces between said two members and with said lubricant-holding chamber, said passageway being provided with a substantially radial funnel-shaped entrance where it communicates with said lubricant-holding chamber, and a baffle plate carried by said stationary member and projecting outward substantially parallel to the radius of such entrance but circumferentially displaced from such entrance so that when the rotatable member rotates said baffle plate directs into said passageway lubricant which is carried in said chamber but permits excess of lubricant to overflow the sides of the baffle plate.

2. In combination, a stationary supporting member, a rotatable member rotatably supported by said supporting member and provided with an internal annular lubricant-holding chamber, said supporting member being provided with a passageway communicating with the bearing surfaces between said two members and with said lubricant-holding chamber, said passageway being provided with a substantially radial entrance where it communicates with said lubricant-holding chamber, and a baffle plate carried by said stationary member and projecting outward substantially parallel to the radius of such entrance but circumferentially displaced from such entrance so that when the rotatable member rotates said baffle plate directs into said passageway lubricant which is carried in said chamber but permits excess of lubricant to overflow the sides of the baffle plate.

3. In combination, a stationary supporting member, a rotatable member rotatably supported by said supporting member and provided with an internal annular lubricant-holding chamber, said supporting member being provided with a passageway communicating with the bearing surfaces between said two members and with said lubricant-holding chamber, said passageway being provided with a substantially radial funnel-shaped entrance where it communicates with said lubricant-holding chamber, and a baffle plate carried by said stationary member and projecting outward substantially parallel to the radius of such entrance but circumferentially displaced from such entrance so that when the rotatable member rotates said baffle plate directs into said passageway lubricant which is carried in said chamber but permits excess of lubricant to overflow the sides of the baffle plate, said baffle plate being narrower than said funnel-shaped entrance.

4. In combination, a stationary supporting member, a rotatable member rotatably supported by said supporting member and provided with an internal annular lubricant-holding chamber, said supporting member being provided with a passageway communicating with the bearing surfaces between said two members and with said lubricant-holding chamber, said passageway being provided with a substantially radial funnel-shaped entrance where it communicates with said lubricant-holding chamber, and a baffle plate carried by said stationary member and projecting outward substantially parallel to the radius of such entrance but circumferentially displaced from such entrance so that when the rotatable member rotates said baffle plate directs into said passageway lubricant which is carried in said chamber but permits excess of lubricant to overflow the sides of the baffle plate, the centers of said baffle plate and of said passageway being relatively displaced along the axis of rotation.

5. In combination, a stationary supporting member, a rotatable member rotatably supported by said supporting member and provided with an internal annular lubricant-holding chamber, said supporting member being provided with a passageway communicating with the bearing surfaces between said two members and with said lubricant-holding chamber, said passageway being provided with a substantially radial funnel-shaped entrance where it communicates with said lubricant-holding chamber, and a baffle plate carried by said stationary member and projecting outward substantially parallel to the radius of such entrance but circumferentially displaced from such entrance so that when the rotatable member rotates said baffle plate directs into said passageway lubricant which is carried in said chamber but permits excess of lubricant to overflow the sides of the baffle plate, the axis of rotation of said rotatable member being substantially horizontal and said baffle plate and the entrance to said passageway being located on the upper side.

6. In combination, a stationary supporting member, a rotatable member rotatably supported by said supporting member and provided with an internal annular lubricant-holding chamber, said rotatable member having a tendency to create an end thrust in one direction and being provided with an end face for taking such end thrust, a bushing between said two members, said stationary member being provided with a passageway communicating with the bearing surface of said bushing and with said lubricant-holding chamber, means for directing lubricant into said passageway as said rotatable member rotates, said two members and said bushing being provided between them with a space into which the bearing surfaces lead, and said bushing being provided with a longitudinal passageway communicating with said space and also communicating with a radial opening located in the thrust-taking end face of said rotatable member and opening at its outer end into said chamber so that by the centrifugal force of rotation suction is created tending to suck lubricant out of said space and discharge it into said chamber.

7. In combination, a stationary supporting member, a rotatable member rotatably supported by said supporting member and having a tendency to create an end thrust in one direction and provided with an internal annular lubricant-holding chamber, said supporting member being provided with a passageway communicating with the bearing surfaces between said two members and with said lubricant-holding chamber, means for directing lubricant into said passageway as said rotatable member rotates, said two members being provided between them with a space into which their bearing surfaces lead, said two members having abutting thrust-taking surfaces, the thrust-taking surface of said rotatable member, being provided with a groove opening at its outer end into said lubricant-holding chamber, and connected at its inner end to said space so that the centrifugal force developed in said groove by said rotation tends to suck lubricant out of said space and the lubricant passing through said groove lubricates said thrust-taking surfaces.

8. In combination, a stationary shaft, a member rotatably mounted on said shaft and provided with an internal annular lubricant-holding chamber, said rotatable member having a tendency to create an end thrust in one direction and being provided with an end face for taking such end thrust, a bushing between said shaft and said rotatable member, said shaft being provided with a passageway communicating with the bearing surface of said bushing and with said lubricant-holding chamber, means for directing lubricant into said passageway as said rotatable member rotates, said shaft and said rotatable member and said bushing being provided between them with a space into which the bearing surfaces lead, and said bushing being provided with a longitudinal passageway communicating with said space and also communicating with a radial opening located in the thrust-taking end face of said rotatable member and opening at its outer end into said chamber so that by the centrifugal force of rotation suction is created tending to suck lubricant out of said space and discharge it into said chamber.

9. In combination, a stationary shaft, a member rotatably mounted on said shaft and having a tendency to create an end thrust in one direction and provided with an internal annular lubricant-holding chamber, said shaft being provided with a passageway communicating with the bearing surfaces between said shaft and said member and with said lubricant-holding chamber, means for directing lubricant into said passageway as said rotatable member rotates, said shaft and said rotatable member being provided between them with a space into which their bearing surfaces lead, said shaft and said rotatable member having abutting thrust-taking surfaces, the thrust-taking surface of said rotatable member being provided with a groove opening at its outer end into said lubricant-holding chamber and connected at its inner end to said space so that the centrifugal force developed in said groove by said rotation tends to suck lubricant out of said space and the lubricant passing through said groove lubricates said thrust-taking surfaces.

In witness whereof I have hereunto set my hand at Indianapolis, Indiana, this second day of September, A. D. one thousand nine hundred and nineteen.

CHESTER S. RICKER.